US 9,036,464 B2

(12) United States Patent
Droux et al.

(10) Patent No.: US 9,036,464 B2
(45) Date of Patent: *May 19, 2015

(54) METHOD AND SYSTEM FOR DISTRIBUTING NETWORK TRAFFIC AMONG MULTIPLE DIRECT HARDWARE ACCESS DATAPATHS

(71) Applicant: Oracle America, Inc., Redwood Shores, CA (US)

(72) Inventors: Nicolas G. Droux, Rio Rancho, NM (US); Sunay Tripathi, Menlo Park, CA (US)

(73) Assignee: Oracle America Inc., Redwood Shores, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 13/650,490

(22) Filed: Oct. 12, 2012

(65) Prior Publication Data

US 2013/0033981 A1   Feb. 7, 2013

Related U.S. Application Data

(63) Continuation of application No. 12/827,929, filed on Jun. 30, 2010, now Pat. No. 8,315,156.

(51) Int. Cl.
  *G01R 31/08* (2006.01)
  *H04L 12/709* (2013.01)
  *G06F 9/455* (2006.01)

(52) U.S. Cl.
  CPC .......... *H04L 45/245* (2013.01); *G06F 9/45558* (2013.01); *G06F 2009/45595* (2013.01); *Y02B 60/33* (2013.01)

(58) Field of Classification Search
  None
  See application file for complete search history.

(56) References Cited

U.S. PATENT DOCUMENTS

| 7,788,411 | B2 * | 8/2010 | Belgaied et al. ............... 709/250 |
| 8,065,454 | B1 | 11/2011 | Sonksen et al. |
| 8,086,739 | B2 * | 12/2011 | Tripathi et al. ............... 709/227 |
| 2006/0087962 | A1 | 4/2006 | Golia et al. |
| 2007/0058526 | A1 | 3/2007 | Jain et al. |
| 2010/0165830 | A1 | 7/2010 | Amir et al. |
| 2010/0220584 | A1 | 9/2010 | DeHaan et al. |
| 2011/0019531 | A1 | 1/2011 | Kim et al. |
| 2011/0283017 | A1 * | 11/2011 | Alkhatib et al. ............... 709/244 |

\* cited by examiner

*Primary Examiner* — David Oveissi
(74) *Attorney, Agent, or Firm* — Osha • Liang LLP (57) ABSTRACT

A system for distributing network traffic among direct hardware access datapaths, comprising: a processor; one or more activated PNICs; a host operating system; and a virtual machine (VM). Each activated PNIC sends and receives data packets over a network. Each activated PNIC is configured with a virtual function. The VM includes a VNIC and a virtual link aggregator configured to maintain a list identifying each activated PNIC. Virtual function mappings for the VM associate the VM with virtual functions for the activated PNICs. The virtual link aggregator selects the first activated PNIC for servicing a network connection and determines a virtual function for the first activated PNIC. The VNIC for the first activated PNIC uses the virtual function to directly transfer network traffic for the network connection between the VM and the first activated PNIC.

17 Claims, 7 Drawing Sheets

METHOD AND SYSTEM FOR DISTRIBUTING NETWORK TRAFFIC AMONG MULTIPLE DIRECT HARDWARE ACCESS DATAPATHS

CROSS-REFERENCE TO RELATED APPLICATIONS

This application claims benefit under 35 U.S.C. §120 to and is a continuation of U.S. patent application Ser. No. 12/827,929 filed on Jun. 30, 2010, entitled "Method and System for Distributing Network Traffic Among Multiple Direct Hardware Access Datapaths." U.S. patent application Ser. No. 12/827,929 is hereby incorporated by reference in its entirety.

BACKGROUND

Network traffic is transmitted over a network, such as the Internet, from a sending system (e.g., computer system) to a receiving system (e.g., computer system) via a physical network interface card (PNIC). A PNIC is a physical hardware device found in a typical computer system that may be used to service one or more network connections by sending and receiving network traffic. Typically, network traffic is transmitted in the form of data packets, where each data packet includes a header and a payload. The payload contains information regarding the source address, destination address, size, transport protocol used to transmit the data packet, and various other information associated with the data packet. The payload contains the actual data to be transmitted to the receiving system.

SUMMARY

In general, embodiments of the invention are directed to a system for distributing network traffic among multiple direct hardware access datapaths. The system comprises: (i) a processor operatively connected to a host computer system; (ii) one or more activated physical network interface cards (PNICs) operatively connected to the host computer system; (iii) a host operating system executing on the host computer system; and (iv) a virtual machine executing on the host computer system. Each one of the activated PNICs is configured to send and receive data packets over a network. Each one of the activated PNICs is configured with a virtual function. A first activated PNIC from the one or more activated PNICs includes a virtual function mapping associating the virtual machine with a virtual function configured for the first activated PNIC. The virtual machine includes a virtual network interface card (VNIC) and a virtual link aggregator. The virtual link aggregator is configured to maintain a list identifying the one or more activated PNICs. One or more virtual function mappings for the virtual machine associate the virtual machine with virtual functions for the one or more activated PNICs. The virtual link aggregator is configured to select, using a load balancing algorithm and the list identifying the activated PNICs, the first activated PNIC from the one or more activated PNICs for servicing a network connection. The virtual link aggregator is further configured to determine the virtual function for the first activated PNIC based on the first activated PNIC and the virtual function mapping for the first activated PNIC. The VNIC for the first activated PNIC uses the virtual function to directly transfer network traffic for the network connection between the virtual machine and the first activated PNIC. The first activated PNIC sends the network traffic for the network connection over the network.

In general, embodiments of the invention are directed to a computer readable storage medium including software instructions, which when executed by a processor perform a method. The method involves determining, by a host link aggregator, that a first activated physical network interface card (PNIC) has failed. The first activated PNIC is one of one or more activated PNICs operatively connected to a host computer system. Each one of the plurality of activated PNICs is configured to send and receive data packets over a network. Based on determining that the first activated PNIC has failed, the host link aggregator deactivates the first activated PNIC and sends a message to a virtual link aggregator hosted on a virtual machine executing on the host computer system. The message indicates that the first activated PNIC has failed. The virtual link aggregator receives the message and determines that the first activated PNIC has failed based on the message. The virtual link aggregator is configured to maintain a list identifying the one or more activated PNICs. Based on determining that the first activated PNIC has failed, the virtual link aggregator removes an entry corresponding with the first activated PNIC from the list.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for method and system for distributing network traffic among multiple direct hardware access datapaths. Embodiments of the invention involve the use of physical network interface cards (PNIC) in accordance with the PCI-SIG® SR-IOV specification. Under the PCI-SIG® SR-IOV specification, a PCI™-compliant PNIC is defined as having physical functions and virtual functions. A physical function is a full PCI™ function used for configuring and managing a PNIC. A virtual function is a lightweight PCI™ function used for data movement of network traffic sent and received by the PNIC. While invoking a physical function enables control of a PNIC, invoking a virtual function does not provide control of a PNIC. PCI-SIG® and PCI™ are trademarks of the Peripheral Component Interconnect-Special Interest Group (PCI-SIG) of Beaverton, Oreg.

In accordance with the PCI-SIG SR-IOV specification, embodiments of the invention may use a virtual function to implement a virtual function mapping between a virtual machine executing on a host computer system and a PNIC operatively connected to the host computer system. By way of the virtual function mapping, a direct hardware access datapath is implemented between the virtual machine and the PNIC such that the virtual machine may be provided with direct hardware access to the PNIC. As such, the virtual machine may use the virtual function to directly transfer network traffic (i.e., data packets) between the virtual machine and the PNIC. Said another way, the network traffic is transferred between the virtual machine and the PNIC without additional processing by any intermediate layers (e.g., hypervisor, host operating system).

Further, in accordance with one or more embodiments of the invention, a host computer system may include multiple virtual machines and multiple PNICs. Accordingly, for each virtual machine—PNIC pair, a direct hardware access datapath may be implemented by way of a virtual function mapping. Moreover, embodiments of the invention may perform a load-balanced distribution of network traffic among the multiple direct hardware access datapaths for a given host computer system.

Figure 1:
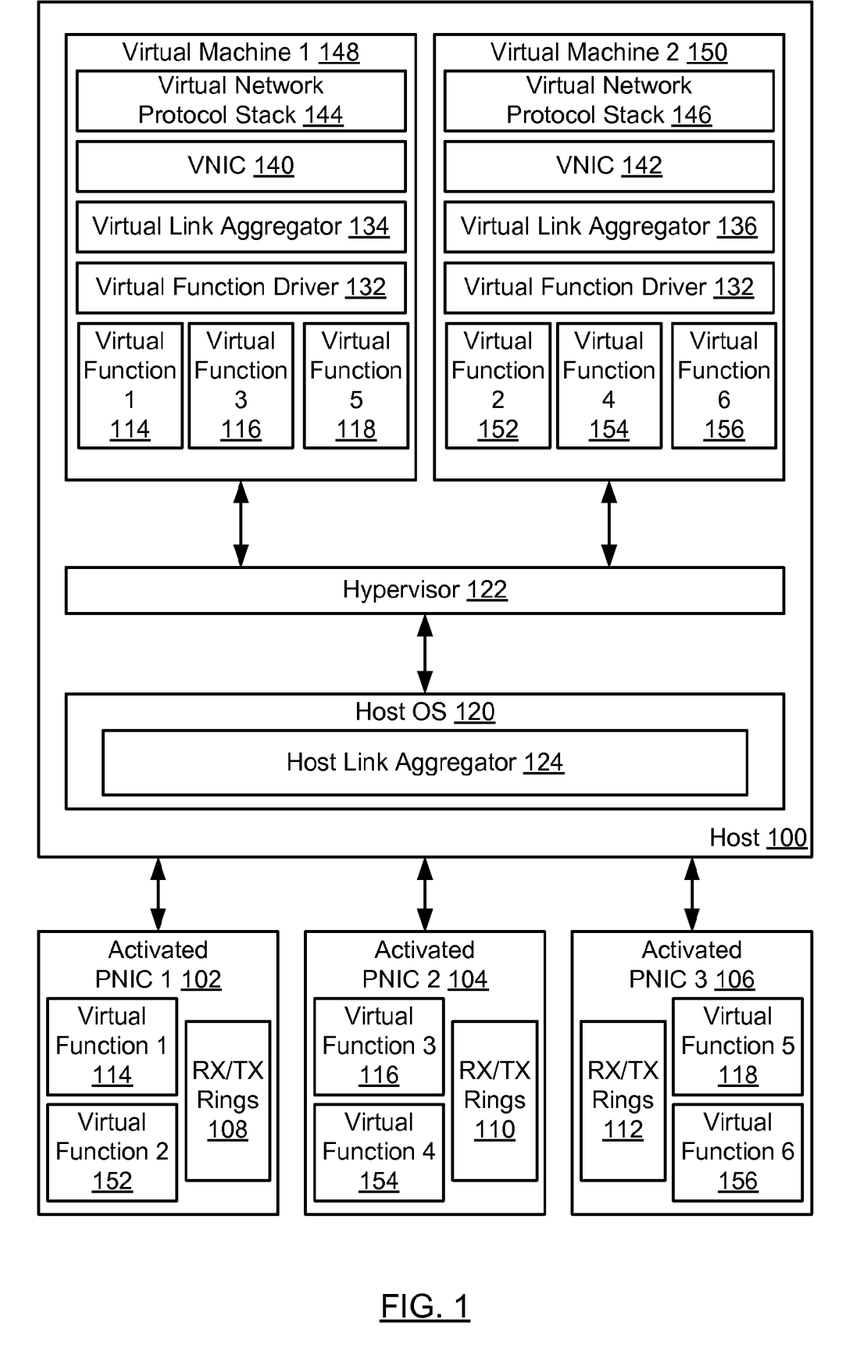
FIG. 1 shows an example of a system in accordance with one or more embodiments of the invention.

FIG. 1 shows an example of a system in accordance with one or more embodiments of the invention. Specifically, FIG. 1 shows components of a host computer system (100), including a host operating system (120), a hypervisor (122), and virtual machines (148, 150). Further, the host computer system (100) is operatively connected to physical network interface cards (PNICs)(102, 104, 106).

In one or more embodiments of the invention, a PNIC (102, 104, 106) is a physical hardware device operatively connected to a host computer system (100). Specifically, a PNIC (102, 104, 106) is configured to send and receive network traffic transmitted to and from the host computer system (100) in the form of data packets. As such, a PNIC (102, 104, 106) may service a network connection by transferring the inbound and outbound network traffic associated with the network connection. Accordingly, in one or more embodiments of the invention, a PNIC (102, 104, 106) may include a receive and transfer rings (RX/TX ring)(108, 110, 112) for temporarily storing inbound and outbound network traffic respectively. In one or more embodiments of the invention, a host computer system (100) may be operatively connected to multiple PNICs (102, 104, 106).

In one or more embodiments of the invention, a PNIC (102, 104, 106) may be configured with one or more virtual functions (114, 116, 118, 152, 154, 156). In one or more embodiments of the invention, a virtual function (114, 116, 118, 152, 154, 156) may be used to create a mapping between a PNIC (102, 104, 106) and a virtual machine (148, 150) executing on the host computer system (100). For example, a first PNIC (102) may be mapped using a first virtual function (114) with a first virtual machine (148). Morover, the first PNIC (102) may also be mapped using a second virtual function (152) with a second virtual machine (150). In each case, the mapped-to virtual machine is provided with direct hardware access to the mapped-to PNIC.

In one or more embodiments of the invention, a PNIC (102, 104, 106) may either be an activated PNIC or a deactivated PNIC. In one or more embodiments of the invention, an activated PNIC is a PNIC that is powered on and configured to send and receive network traffic. In one or more embodiments of the invention, a deactivated PNIC may be powered off or powered-down to a standby mode. In such embodiments of the invention, the deactivated PNIC is not configured to send and receive network traffic.

In one or more embodiments of the invention, the state of a virtual function mapping between a PNIC (102, 104, 106) and a virtual machine (148, 150) may be obtained. In one or more embodiments of the invention, the aforementioned state information is obtainable so long as the PNIC is either powered-on (i.e., activated) or powered-down (i.e., standby mode). Said another way, the aforementioned state information may not be obtainable when the PNIC is powered-off (i.e., deactivated).

In one or more embodiments of the invention, a PNIC (102, 104, 106) may be associated with one or more sensors (not shown) implemented in hardware or software. In one or more embodiments of the invention, a sensor may be configured to obtain a state (i.e., activated, deactivated/standby, failed) for a PNIC. Alternatively, in one or more other embodiments of the invention, a sensor may be configured to obtain a performance metric value (e.g., temperature) associated with a state determination for a PNIC.

In one or more embodiments of the invention, a host operating system (120) executing on the host computer system (100) is configured to process and forward an inbound data packet initially received by a PNIC (102, 104, 106) to a virtual machine (148, 150) executing on the host computer system (100). Further, in one or more embodiments of the invention, the host operating system (120) is configured to send an outbound data packet across a network to other host computer systems (not shown) using a PNIC (102, 104, 106).

In one or more embodiments of the invention, a host operating system (120) may include a host link aggregator (124) configured to manage a set of PNICs (102, 104, 106). Accordingly, in such embodiments, the host link aggregator (124) presents a single interface for processes executing in the host computer system (100) to use the PNICs (102, 104, 106). As such, to components above the host link aggregator (124) (i.e., processes executing in the host computer system), the host link aggregator (124) appears as a PNIC. In one or more embodiments of the invention, the host link aggregator (124) is configured to maintain a list of all PNICs (102, 104, 106) operatively connected to the host computer system (100). The list maintains an entry for each PNIC (102, 104, 106) specifying a state for the PNIC. In one or more embodiments of the invention, the host link aggregator (124) is configured to obtain a state for a PNIC (102, 104, 106) indicating whether the PNIC is activated, deactivated or in standby mode, or failed. In one or more embodiments of the invention, a list entry for each PNIC (102, 104, 106) may include a state for a virtual function mapping between the PNIC and a virtual machine (148, 150) executing on the host computer system (100). Accordingly, in such embodiments, the host link aggregator (124) is configured to obtain a virtual function mapping state for a PNIC-virtual machine combination indicating whether there is an operative or inoperative virtual function mapping between the PNIC and the virtual machine.

In one or more embodiments of the invention, the host link aggregator (124) may be configured to obtain state information (e.g., state for a PNIC, state for a virtual function mapping associated with a PNIC) for a PNIC (102, 104, 106) using a sensor (not shown) associated with the PNIC (102, 104, 106). For example, in one or more embodiments of the invention, the host link aggregator (124) may obtain the most recent state for a PNIC (102, 104, 106) by periodically polling a sensor associated with the PNIC (102, 104, 106) based on a defined time interval. Alternatively, in one or more other embodiments of the invention, the host link aggregator (124) may receive a notification from the sensor that a state for the PNIC (102, 104, 106) has changed. Accordingly, in response to the notification, the host link aggregator (124) may obtain the state for the PNIC (102, 104, 106) based on receiving a notification from a sensor (not shown) associated with the PNIC (102, 104, 106). Those skilled in the art will appreciate that similar polling and notification mechanisms, as described here, may be implemented to obtain any type of state information (e.g., state for a PNIC, state for virtual function mapping associated with a PNIC, etc.) associated with a PNIC.

In one or more embodiments of the invention, a hypervisor (122) executing on the host is configured to send network traffic between a host operating system (120) and a virtual machine (148, 150). A hypervisor (122) may be any communication mechanism implemented on a host computer system (100) to facilitate communication between a host operating system (120) and a virtual machine (148, 150).

In one or more embodiments of the invention, a virtual machine (148, 150) is an isolated software execution environment hosted on a host computer system (100). In accordance with embodiments of the invention, a virtual machine (148, 150) is configured to simulate the execution of a process as if the process was executing on a physical computing device. A virtual machine (148, 150) may include an instance of an operating system. The operating system executing on a virtual machine (148, 150) may or may not be the same as a host operating system (120) for the host computer system (100). Accordingly, a host computer system (100) may serve as host to multiple virtual machines (148, 150) where each virtual machine (148, 150) is associated with a distinct operating system instance and therefore a distinct kernel. In one or more embodiments of the invention, a virtual machine (148, 150) may include: (i) a mapping to a virtual function (114, 116, 118, 152, 154, 156); (ii) a virtual function driver (132); (iii) a virtual link aggregator (134, 136); (iv) a guest VNIC (140, 142); and (v) a guest virtual network protocol stack (144, 146).

In one or more embodiments of the invention, a guest VNIC (140, 142) performs MAC layer functionality. In such embodiments of the invention, the guest VNIC (140, 142) includes the functionality of a physical NIC. Specifically, a guest VNIC (140, 142) may be configured to send and receive network traffic (i.e., data packets) between a virtual machine (148, 150) and a host operating system (120). Further, in one or more embodiments of the invention, a guest VNIC (140, 142) may be configured to use a virtual link aggregator (134, 136) to send and receive network traffic (i.e., data packets) directly between a virtual machine (148, 150) and a PNIC (102, 104, 106) associated by a virtual function mapping. In one or more embodiments of the invention, a guest VNIC (140, 142) may be implemented as described in U.S. patent application Ser. No. 11/112,063, which is hereby incorporated by reference.

In one or more embodiments of the invention, the virtual link aggregator (134, 136) presents a single interface for processes executing on a virtual machine (148, 150) to use the PNICs (102, 104, 106). Accordingly, in such embodiments, the virtual link aggregator (134, 136) appears as a PNIC to components above the virtual link aggregator (134, 136) (i.e., processes executing in the host computer system). In one or more embodiments of the invention, the virtual link aggregator (134, 136) is configured to maintain a list (not shown) of all activated PNICs (102, 104, 106) operatively connected to the host computer system (100). In one or more embodiments of the invention, the virtual link aggregator (134, 136) is configured to add an entry to or remove an entry from the list based on receiving a message from a host link aggregator (124). For example, the virtual link aggregator (134, 136) may receive a message indicating that a particular PNIC (102, 104, 106) is activated. Accordingly, based on receiving the aforementioned message, the virtual link aggregator (134, 136) is configured to add an entry corresponding with the specified activated PNIC to the list. Moreover, the virtual link aggregator (134, 136) may receive a message indicating that a particular PNIC (102, 104, 106) has failed or has been deactivated. Accordingly, based on receiving the aforementioned message, the virtual link aggregator (134, 136) is configured to remove an entry corresponding with the specified failed/deactivated PNIC from the list.

In one or more embodiments of the invention, the virtual link aggregator (134, 136) uses the list of activated PNICs (102, 104, 106) with a load balancing algorithm to select an activated PNIC for sending network traffic over a network. A load balancing algorithm is an algorithm used to distribute workload (e.g., the sending of outbound data packets) among a set of resources (e.g., activated PNICs as identified in the list of activated PNICs maintained by the virtual link aggregator).

In one or more embodiments of the invention, the workload distribution may be performed on a per-network connection basis. As such, a load balancing algorithm may determine a particular activated PNIC for each active network connection through which network traffic will be transmitted to and from the host computer system (100). In one or more embodiments of the invention, a hash function may be used to determine an activated PNIC for a particular network connection based on information pertaining to that network connection. For example, the load balancing algorithm may perform a hash of a destination packet header associated with network traffic for the particular network connection and, based on the result of the hash, designate an activated PNIC for servicing that network connection. Alternatively, the load balancing algorithm may designate an activated PNIC for servicing a connection based on one or more of the following: an anticipated measured workload for the connection, a measured workload for the connection, and the available bandwidths for each activated PNIC operatively connected to the host computer system (100). When an activated PNIC is designated for servicing a particular network connection, the PNIC will be used to send and receive all network traffic associated with the particular network connection. In one or more embodiments of the invention, the host link aggregator (124) may be configured to perform the same or similar load balancing functions in relation to outbound network traffic.

In one or more embodiments of the invention, a virtual function driver (132) is an interface configured to provide direct hardware access to a PNIC (102, 104, 106) based on a virtual function mapping between the virtual machine (148, 150) and the PNIC (102, 104, 106). Accordingly, a virtual link aggregator (134, 136) may use the virtual function driver (132) to directly transfer network traffic (i.e., data packets) between the virtual machine (148, 150) and the PNIC (102, 104, 106) without requiring: (i) use of a hypervisor (122) executing on the host computer system (142); and (ii) processing of the transferred network traffic by the host operating system (120).

In one or more embodiments of the invention, a guest virtual network protocol stack (144, 146) includes an Internet Protocol (IP) layer, inbound and outbound virtual serialization queues, and a transport layer. The IP layer, for example, is configured to perform IP level processing for both inbound and outbound data packets. The inbound virtual serialization queue is a queue data structure configured to receive data packets from the IP layer prior to the data packets being processed by the transport layer. The transport layer is configured to process inbound and outbound data packets in accordance with Transmission Control Protocol (TCP), User Datagram Protocol (UDP), or both UDP and TCP. The outbound virtual serialization queue is a queue data structure configured to receive data packets from the guest VNIC (140, 142) with which the guest virtual network stack (144, 146) is associated.

Guest VNICs (140, 142), as discussed in relation to FIG. 1, may be implemented as the VNICs described in: (i) commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi; and (ii) commonly owned U.S. Pat. No. 7,613,132, entitled "Method and System for Controlling Virtual Machine Bandwidth" in the names of Sunay Tripathi, Tim P. Marsland, and Nicolas G. Droux. The contents of the aforementioned descriptions are hereby incorporated by reference in their entirety.

Embodiments of the invention may be utilized in a variety of virtual machine architectures. For example, one or more embodiments of the invention may be implemented on Xen® architectures involving: (i) a control host operating system (e.g., Dom 0); and (ii) one or more virtual machines (e.g., Dom U) executing guest operating system instances. In such embodiments of the invention, the hypervisor is an intermediate communication layer that passes network traffic between hardware features (e.g., PNICs) and the host/guest operating systems. Examples of exemplary architectures include, but are not limited to, Xen®. Xen® is a registered trademark overseen by the Xen Project Advisory Board.

Figure 2A:
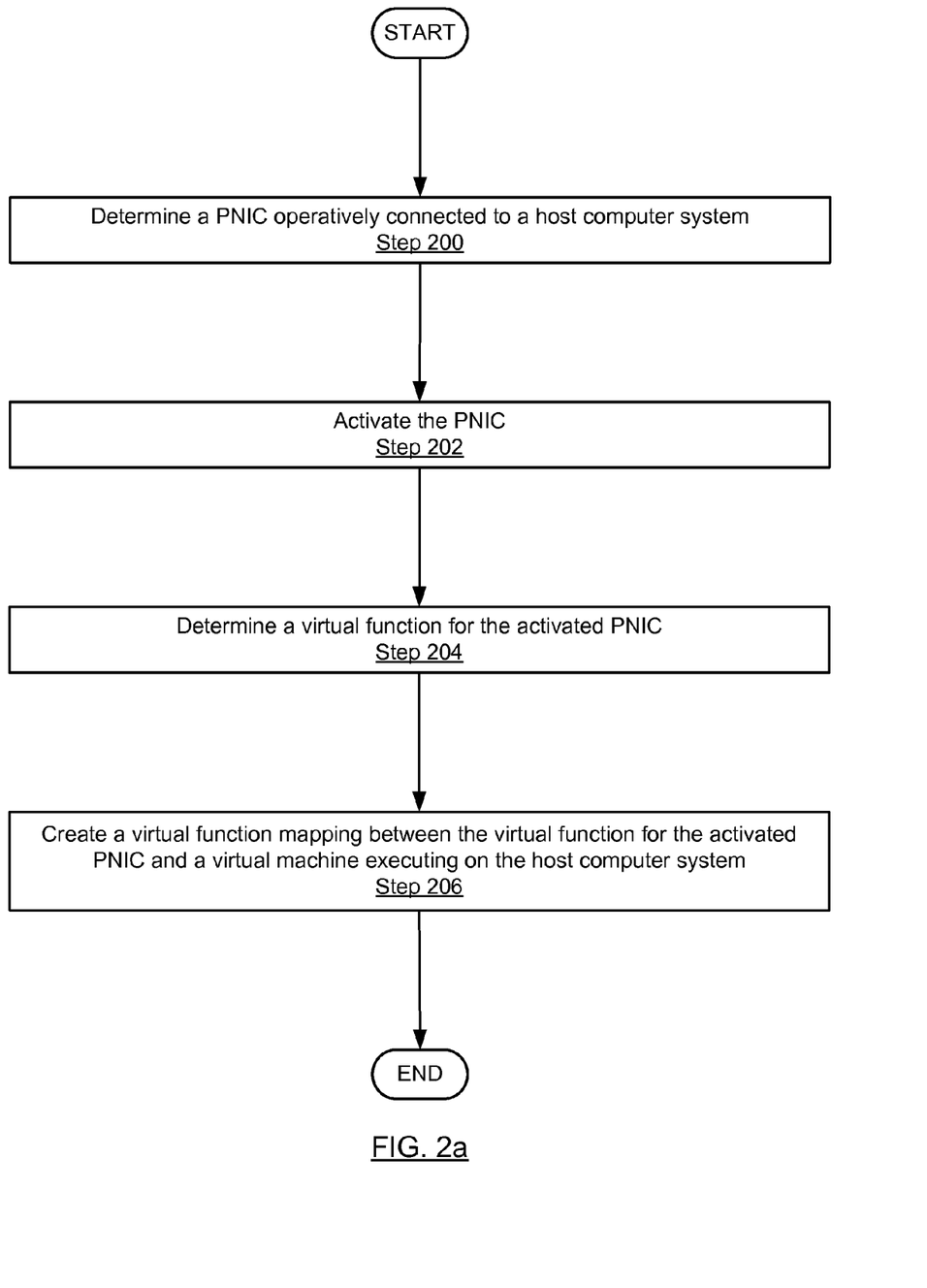
FIGS. 2a-2c show a flowchart in accordance with one or more embodiments of the invention.
Figure 2B:
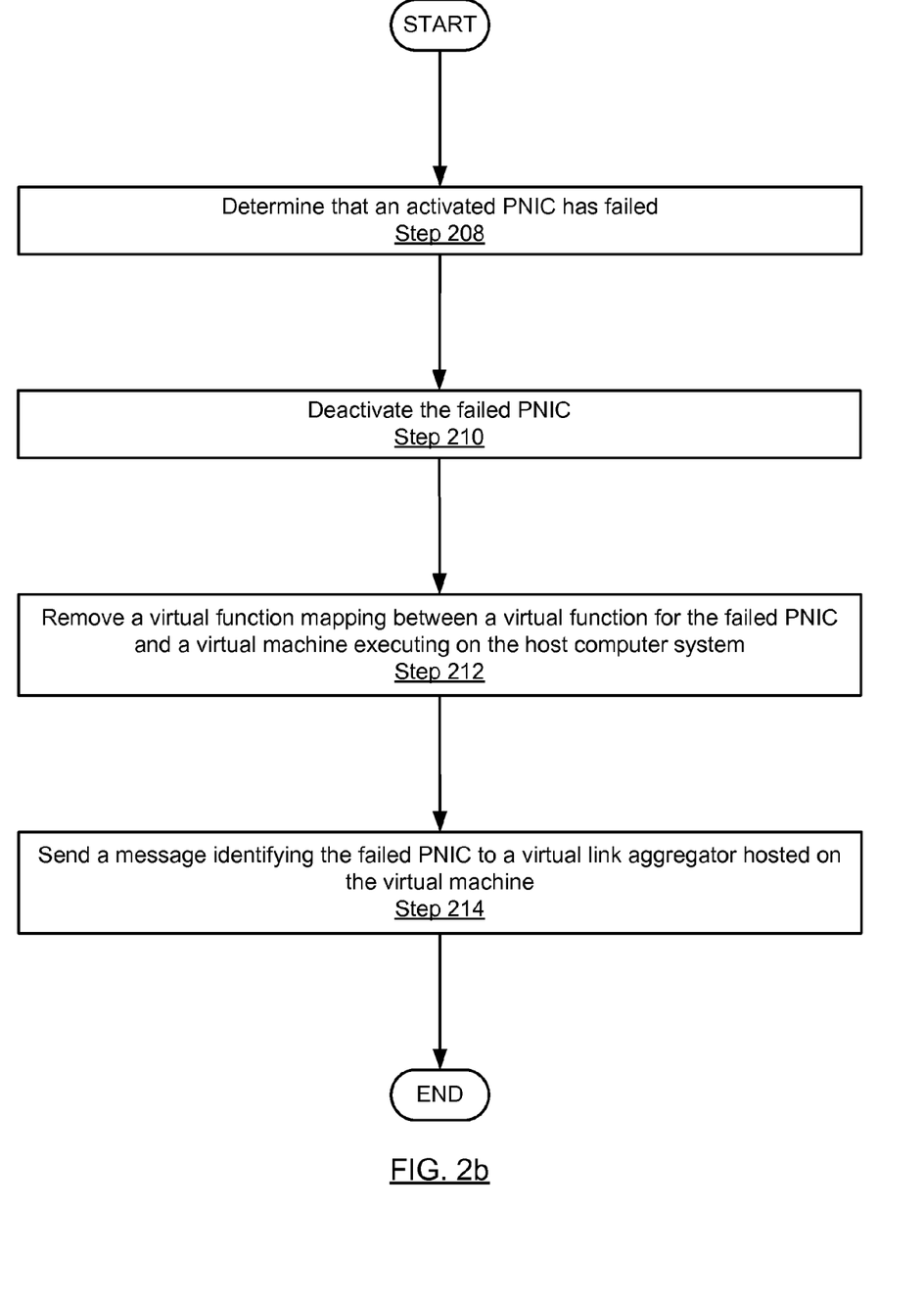
Figure 2C:
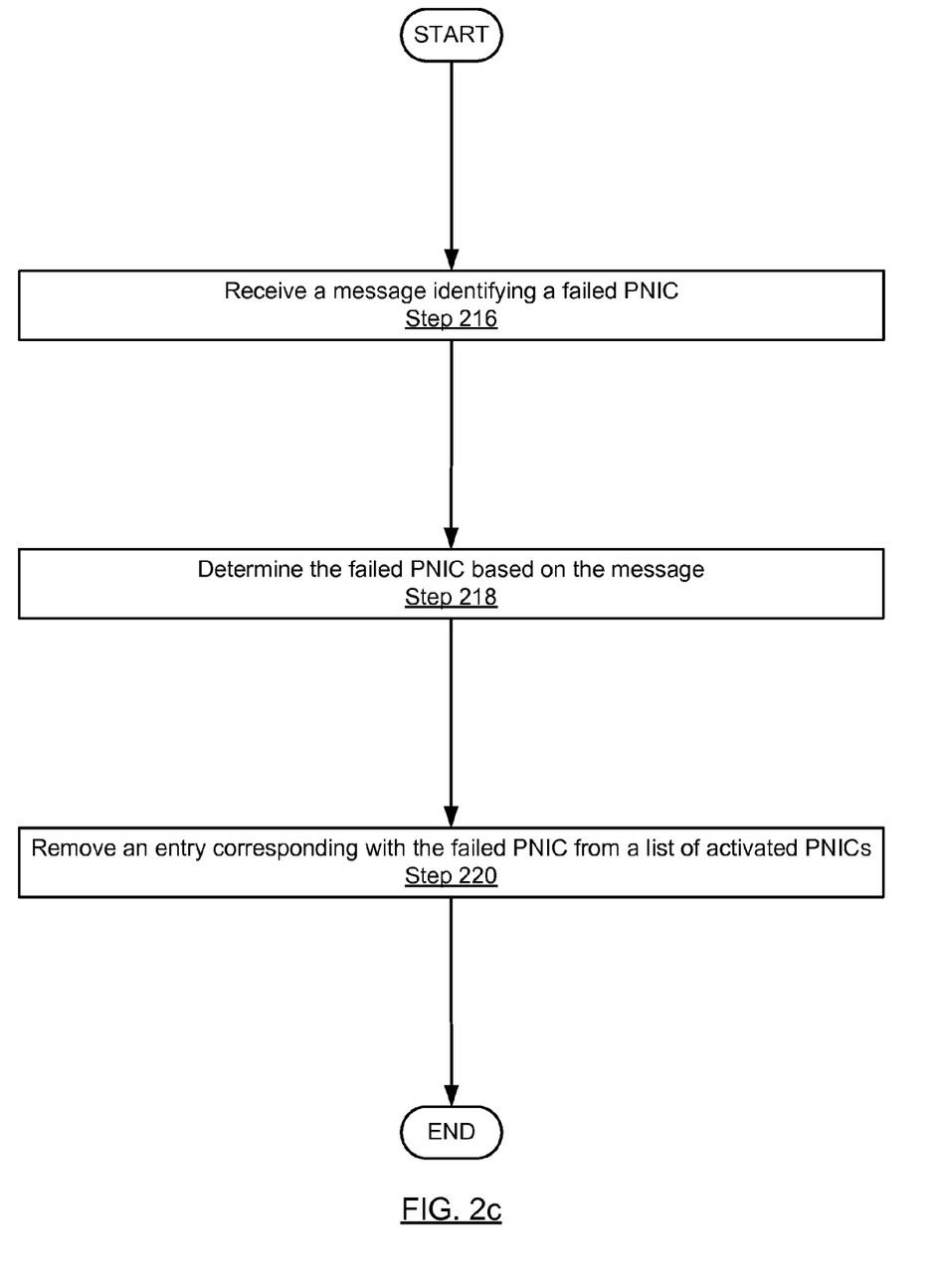

FIGS. 2a-2c show a flowchart in accordance with one or more embodiments of the invention. While the various steps in the flowchart are presented and described sequentially, one of ordinary skill will appreciate that some or all of the steps may be executed in different orders, may be combined, or omitted, and some or all of the steps may be executed in parallel.

The process shown in FIG. 2a may be used, for example when a host computer system is booting, to activate a PNIC and create a virtual function mapping between the activated PNIC and a virtual machine Specifically, in one or more embodiments of the invention, a host link aggregator may perform the steps of the process shown in FIG. 2a.

In Step 200, a PNIC operatively connected to a host computer system is determined. In Step 202, the PNIC determined in Step 200 is activated. Accordingly, once activated, the PNIC is configured to send and receive network traffic for the host computer system.

In Step 204, a virtual function is determined for the activated PNIC. In Step 206, a virtual function mapping is created associating the activated PNIC with a virtual machine executing on the host computer system.

In accordance with embodiments of the invention, and based on the created virtual function mapping, a mapped-to virtual machine now has direct hardware access to the mapped-to PNIC at the completion of Step 206. Accordingly, the virtual machine may directly transfer network traffic (i.e., data packets) between the virtual machine and the PNIC without requiring: (i) use of a hypervisor executing on a host computer system; and (ii) processing of the transferred network traffic by a host operating system executing on the host computer system.

Moreover, in one or more embodiments of the invention, there may be a number of PNICs operatively connected to the host computer system. Accordingly, the steps of FIG. 2a may be performed with respect to each PNIC. As such, a number of virtual function mappings may be created for each PNIC such that the PNIC may be associated with multiple virtual machines executing on the host computer system.

The process shown in FIG. 2b may be used, for example, to perform certain actions when a PNIC operatively connected to the host computer system has failed. Specifically, in one or more embodiments of the invention, the steps shown in FIG. 2b may be performed by a host link aggregator to (i) discover a PNIC failure and (ii) communicate the PNIC failure to a virtual link aggregator hosted on a virtual machine.

In Step 208, a determination is made that a previously activated PNIC operatively connected to a host computer system has failed. For example, the activated PNIC may experience a malfunction such that the PNIC is no longer capable of sending and receiving network traffic. Accordingly, in one or more embodiments of the invention, the host link aggregator may obtain a state for the previously activated PNIC and, based on the obtained state, determine whether the previously activated PNIC has failed. In Step 210, the failed PNIC is deactivated (i.e., powered down).

In Step 212, a virtual function mapping between the failed PNIC and a virtual machine is removed. In Step 214, a message identifying the failed PNIC is sent to a virtual link aggregator hosted on a virtual machine executing in the host computer system. In embodiments of the invention where the host computer system includes more than one virtual machine, Steps 212 and 214 may be performed for each virtual function mapping that exists between the failed PNIC and the multiple mapped-to virtual machines executing on the host computer system.

The process shown in FIG. 2c may be used when a PNIC operatively connected to the host computer system has failed. Specifically, in one or more embodiments of the invention, a virtual link aggregator hosted on a virtual machine may perform the steps of the process shown in FIG. 2c.

In Step 216, a message identifying the failed PNIC is received. In Step 218, the failed PNIC is determined based on the message. In Step 220, an entry corresponding to the failed PNIC is removed from a list of activated PNICs maintained by a virtual link aggregator. Accordingly, because the failed PNIC is no longer identified in the list of activated PNICs, the failed PNIC will not be considered by a virtual link aggregator using a load balancing algorithm to select a PNIC for sending outbound network traffic.

Figure 3A:
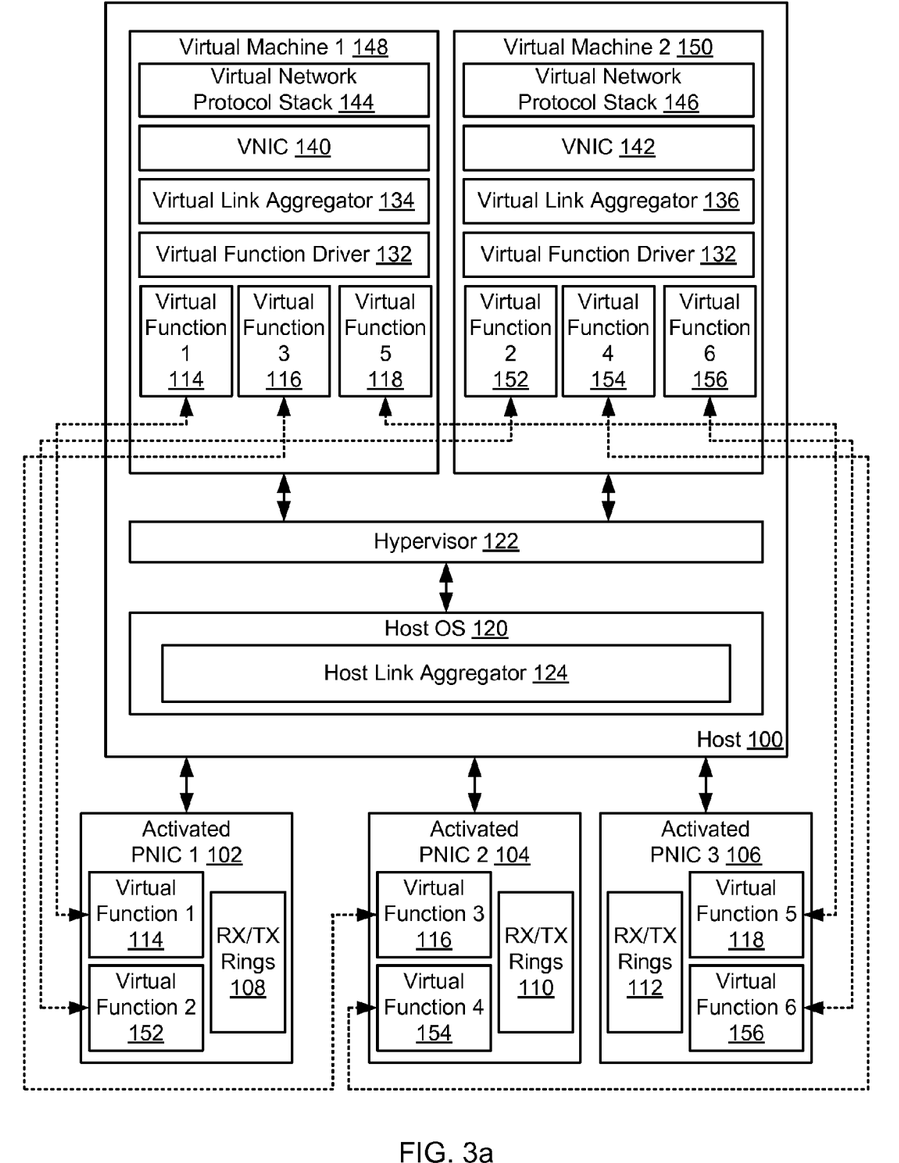
FIGS. 3a and 3b show an example of a system in accordance with one or more embodiments of the invention.
Figure 3B:
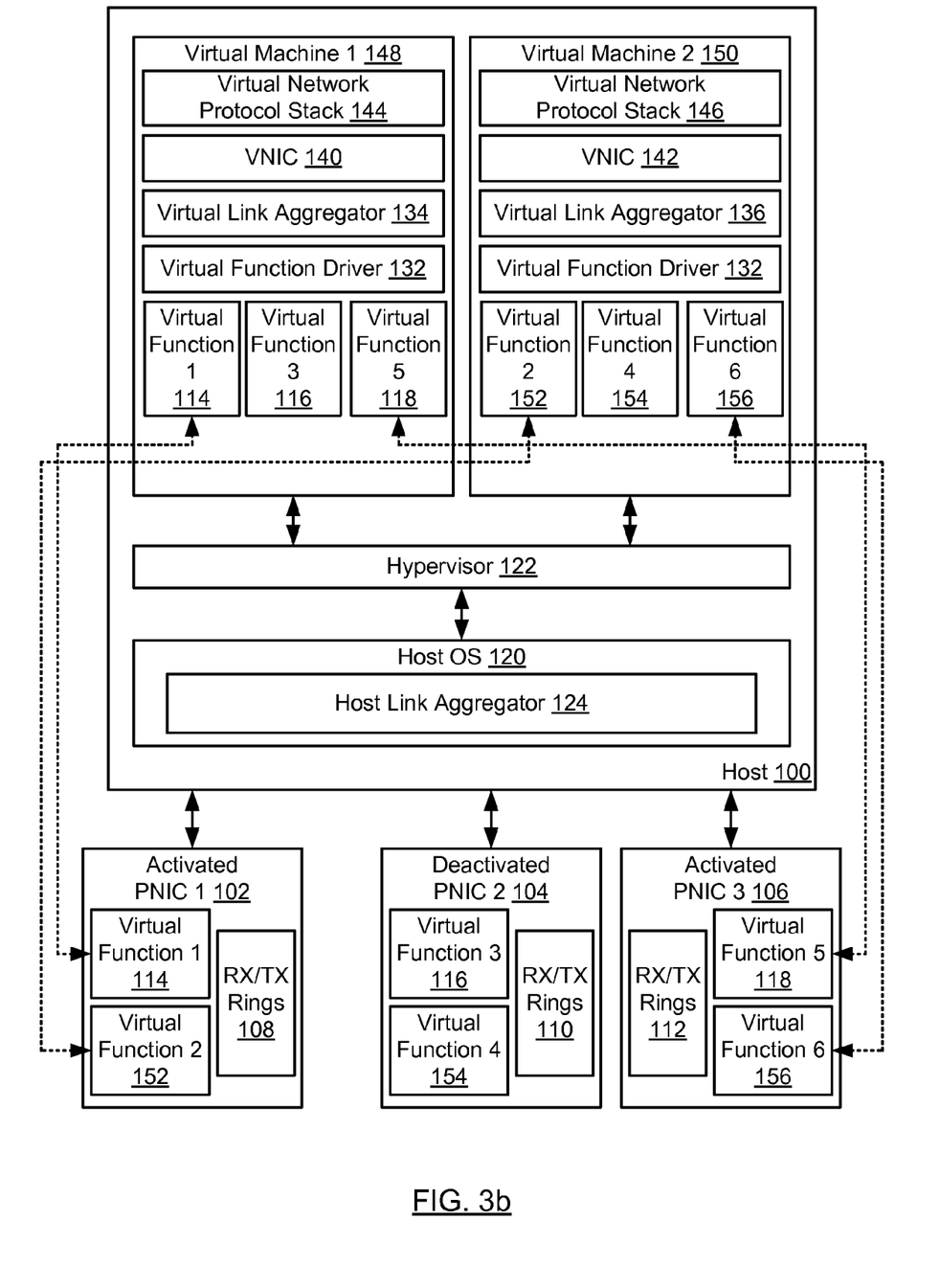

FIGS. 3a and 3b shown an example of a system in accordance with one or more embodiments of the invention. The system depicted in FIGS. 3a and 3b features many of the same components shown in and described in relation to FIG. 1. As such, FIGS. 3a and 3b show components of a host computer system (100), including a host operating system (120), a hypervisor (122), and two virtual machines (148, 150). Further, the host computer system (100) is operatively connected to three PNICs (102, 104, 106).

With respect to FIG. 3a, assume the host computer system (100) has just finished booting. Accordingly, a host link aggregator (124) determines that a first PNIC (102), a second PNIC (104), and a third PNIC (106) are operatively connected to the host computer system (100). Based on the determination, the host link aggregator (124) activates each of the PNICs (102, 104, 106). Accordingly, the activated PNICs (102, 104, 106) are each configured to send and receive network traffic (i.e., data packets) for the host computer system (100).

Further, the host link aggregator (124) determines virtual functions for each activated PNIC. As shown in FIG. 3a, a first virtual function (114) is determined for the first activated PNIC (102), a second virtual function (152) is determined for the first activated PNIC (102), a third virtual function (116) is determined for the second activated PNIC (104), a fourth virtual function (154) is determined for the second activated PNIC (104), a fifth virtual function (118) is determined for the third activated PNIC (106), and a sixth virtual function (156) is determined for the third activated PNIC (106).

Moreover, the host link aggregator (124) creates a virtual function mapping associating each determined virtual function (114, 116, 118, 152, 154, 156) with a virtual machine (148, 150) executing on the host computer system (100). As marked by bi-direction dashed lines in FIG. 3*a*, the host link aggregator (124): (i) uses the first virtual function (114) to create a virtual function mapping between the first activated PNIC (102) and the first virtual machine (148); (ii) uses the second virtual function (152) to create a virtual function mapping between the first activated PNIC (102) and the second virtual machine (150); (iii) uses the third virtual function (116) to create a virtual function mapping between the second activated PNIC (104) and the first virtual machine (148); (iv) uses the fourth virtual function (154) to create a virtual function mapping between the second activated PNIC (104) and the second virtual machine (150); (v) uses the fifth virtual function (118) to create a virtual function mapping between the third activated PNIC (106) and the first virtual machine (148); and (vi) uses the sixth virtual function (156) to create a virtual function mapping between the third activated PNIC (106) and the second virtual machine (150).

Further, a virtual link aggregator (134, 136) hosted in a virtual machine (148, 150) maintains a list of activated PNICs operatively connected to the host computer system (100). For example, each virtual link aggregator (134, 136) shown in FIG. 3*a* initially maintains a list with at least three entries corresponding with the first activated PNIC (102), the second activated PNIC (104), and the third activated PNIC (106). Accordingly, a virtual link aggregator (134, 136) uses a list of activated PNICs with a load balancing algorithm to determine an activated PNIC (102, 104, 106) for purposes of servicing a network connection. Specifically, based on the selection of an activated PNIC (102, 104, 106), a virtual link aggregator (134, 136) uses a virtual function (114, 116, 118) configured for the selected PNIC (102, 104, 106) to directly transfer outbound network traffic to the selected PNIC (102, 104, 106). As such, by using the created virtual function mappings, embodiments of the invention may directly transfer network traffic between a virtual machine (148, 150) and an activated PNIC (102, 104, 106) without requiring: (i) use of the hypervisor (122); and (ii) processing of the transferred network traffic by the host operating system (120).

With respect to FIG. 3*b*, now assume that the second activated PNIC (104) has failed. Because the host link aggregator (124) is configured to obtain a state for each PNIC (102, 104, 106) operatively connected to the host computer system (100), the host link aggregator (124) makes a determination that the second activated PNIC (104) has failed. Based on the determination that the second activated PNIC (104) has failed, the host link aggregator (124): (i) deactivates the failed PNIC (104); (ii) sends a first message to a virtual link aggregator (134) hosted on the first virtual machine (148) indicating the failed PNIC (104); and (iii) sends a second message to a virtual link aggregator (136) hosted on the second virtual machine (150) indicating the failed PNIC (104). Further, as indicated in FIG. 3*b* by the absence of any bi-directional dashed lines in relation to the deactivated PNIC (104), the host link aggregator (124) may remove the virtual function mappings associating the second activated PNIC (104) with the first virtual machine (148) and the second virtual machine (150).

Upon receiving the first message from the host link aggregator (124), the virtual link aggregator (134) hosted on the first virtual machine (148) determines the second PNIC (104) has failed based on the first message. Accordingly, the virtual link aggregator (134) for the first virtual machine (148) removes an entry corresponding with the second PNIC from a list of activated PNICs maintained by the virtual link aggregator (134). Similarly, upon receiving the second message from the host link aggregator (124), the virtual link aggregator (136) hosted on the second virtual machine (150) determines the second PNIC (104) has failed based on the second message. Likewise, the virtual link aggregator (136) for the second virtual machine (150) removes an entry corresponding with the second PNIC from a list of activated PNICs maintained by the virtual link aggregator (136).

Based on the failure of the second activated PNIC (104), the second PNIC (104)—now deactivated—no longer sends and receives network traffic for the host computer system (100). Specifically, because entries corresponding with the second PNIC (104) have been removed from lists maintained by virtual link aggregators (134, 136), the second PNIC (104) is no longer considered as a candidate by a virtual link aggregator (134, 136) (e.g., using a load balancing algorithm) for servicing a network connection (e.g., sending outbound network traffic).

Figure 4:
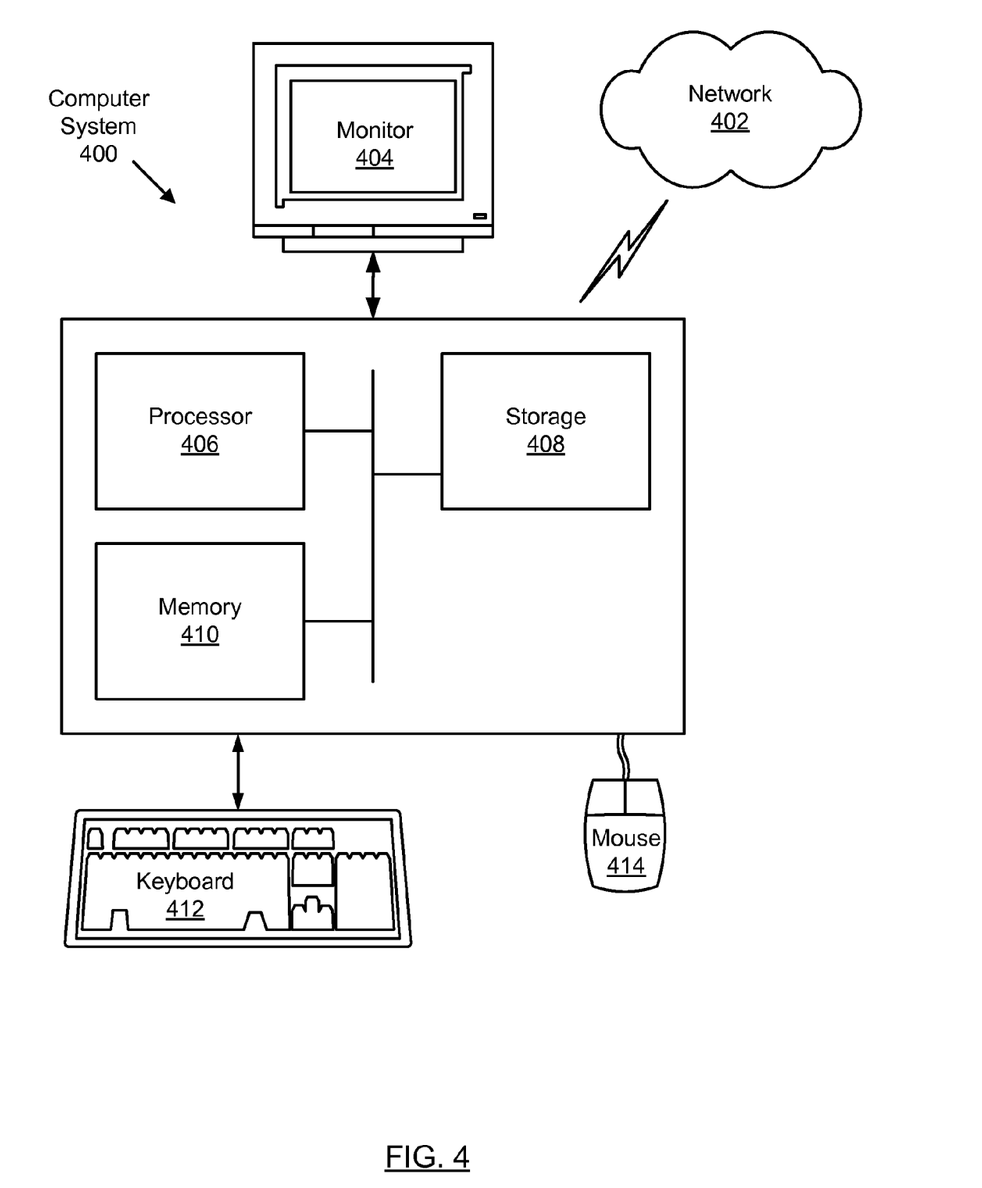
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processors (406), associated memory (410) (e.g., random access memory (RAM), cache memory, flash memory, etc.), a storage device (408) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (412), a mouse (414), or a microphone (not shown). Further, the computer (400) may include output means, such as a monitor (404) (e.g., a liquid crystal display (LCD), a plasma display, or cathode ray tube (CRT) monitor). The computer system (400) may be connected to a network (402) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

Further, instructions to perform embodiments of the invention may be stored on a computer readable storage medium such as a compact disc (CD), a diskette, a tape, physical memory, or any other tangible computer readable storage medium that includes functionality to store computer readable program code to perform embodiments of the invention. In one embodiment of the invention the instructions, when executed by a processor(s), are configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for distributing network traffic among multiple direct hardware access datapaths, comprising:
a processor operatively connected to a host computer system;
a plurality of activated physical network interface cards (PNICs) operatively connected to the host computer system, wherein each one of the plurality of activated PNICs is configured to send and receive data packets over a network, wherein each one of the plurality of activated PNICs is configured with one of a plurality of virtual functions, wherein the plurality of activated PNICs comprises a first activated PNIC configured with a first virtual function from the plurality of virtual functions;
a host operating system executing on the host computer system;
a first virtual machine executing on the host computer system, comprising:
a first virtual network interface card (VNIC); and
a first virtual link aggregator, wherein the first virtual link aggregator is configured to maintain a first list identifying the plurality of activated PNICs;
wherein each one of a plurality of virtual function mappings for the first virtual machine associates the first virtual machine with one of the plurality of virtual functions, wherein the plurality of virtual function mappings comprises a first virtual function mapping associating the first virtual machine with the first virtual function configured for the first activated PNIC,
wherein the first virtual link aggregator is further configured to:
select from the first list, the first activated PNIC from the plurality of activated PNICs for servicing a first network connection; and
determine the first virtual function based on the first activated PNIC and the first virtual function mapping, wherein the first VNIC uses the first virtual function to directly transfer network traffic for the first network connection between the first virtual machine and the first activated PNIC, and wherein the first activated PNIC sends network traffic for the first network connection over the network.

2. The system of claim 1, wherein
the host operating system comprises a host link aggregator configured to:
determine that the first activated PNIC has failed;
based on determining that the first activated PNIC has failed:
deactivate the first activated PNIC;
send, to the first virtual link aggregator, a first message indicating that the first activated PNIC has failed;
the first virtual link aggregator is further configured to:
receive the first message;
determine the first activated PNIC has failed based on the first message; and
based on determining the first activated PNIC has failed:
remove an entry corresponding with the first activated PNIC from the first list.

3. The system of claim 2, wherein the first virtual link aggregator is further configured to:
based on determining the first activated PNIC has failed:
remove the first virtual function mapping.

4. The system of claim 2, wherein the plurality of activated PNICs further comprises a second activated PNIC configured with a second virtual function from the plurality of virtual functions,
wherein the plurality of virtual function mappings further comprises a second virtual function mapping associating the first virtual machine with the second virtual function configured for the second activated PNIC, and
wherein the first virtual link aggregator is further configured to:
select, using the load balancing algorithm and the first list, the second activated PNIC from the plurality of activated PNICs for servicing a second network connection; and
determine the second virtual function based on the second activated PNIC and the second virtual function mapping, wherein the first VNIC uses the second virtual function to directly transfer network traffic for the second network connection between the first virtual machine and the second activated PNIC, and wherein the second activated PNIC sends network traffic for the second network connection over the network.

5. The system of claim 1, further comprising:
a second virtual machine executing on the host computer system, comprising:
a second VNIC; and
a second virtual link aggregator, wherein the second virtual link aggregator is configured to maintain a second list identifying the plurality of activated PNICs,
wherein each one of a plurality of virtual function mappings for the second virtual machine associates the second virtual machine with one of the plurality of virtual functions, wherein the plurality of virtual function mappings comprises a second virtual function mapping associating the second virtual machine with a second virtual function configured for the first activated PNIC,
wherein the second virtual link aggregator is further configured to:
select, from the second list, the first activated PNIC from the plurality of activated PNICs for servicing a second network connection; and
determine the second virtual function based on the first activated PNIC and the second virtual function mapping, wherein the second VNIC uses the second virtual function to directly transfer network traffic for the second network connection between the second virtual machine and the first activated PNIC, and wherein the first activated PNIC sends network traffic for the second network connection over the network.

6. The system of claim 5, wherein
the host operating system comprises a host link aggregator configured to:
determine that the first activated PNIC has failed;
based on determining that the first activated PNIC has failed:
deactivate the first activated PNIC;
send, to the second virtual link aggregator, a first message indicating that the first activated PNIC has failed;

the second virtual link aggregator is further configured to:
  receive the first message;
  determine the first activated PNIC has failed based on the first message; and
  based on determining the first activated PNIC has failed:
    remove an entry corresponding with the first activated PNIC from the second list.

7. The system of claim 6, wherein the plurality of activated PNICs further comprises a second activated PNIC configured with a third virtual function from the plurality of virtual functions,
  wherein the plurality of virtual function mappings further comprises a third virtual function mapping associating the second virtual machine with the third virtual function configured for the second PNIC, and
  wherein the second virtual link aggregator is further configured to:
    select, from the second list, the second activated PNIC from the plurality of activated PNICs for servicing a third network connection; and
    determine the third virtual function based on the second activated PNIC and the third virtual function mapping, wherein the second VNIC uses the third virtual function to directly transfer network traffic for the third network connection between the second virtual machine and the second activated PNIC, and wherein the second activated PNIC sends network traffic for the third network connection over the network.

8. The system of claim 1, wherein
the host operating system comprises a host link aggregator configured to:
  determine the first virtual function for the first activated PNIC;
  create the first virtual function mapping associating the first virtual machine with the first virtual function configured for the first activated PNIC, and
the virtual link aggregator is further configured to:
  add an entry to the first list, wherein the entry corresponds with the first activated PNIC.

9. The system of claim 1, wherein directly transferring network traffic for the first network connection between the first virtual machine and the first activated PNIC does not require processing of network traffic for the first network connection by a hypervisor executing on the host computer system and does not require processing of network traffic for the first network connection by the host operating system.

10. A non-transitory computer readable storage medium comprising software instructions, which when executed by a processor, perform a method, the method comprising:
  determining, by a host link aggregator, that a first activated physical network interface card (PNIC) has failed, wherein the first activated PNIC is one of a plurality of activated PNICs operatively connected to a host computer system, and wherein each one of the plurality of activated PNICs is configured to send and receive data packets over a network;
  based on determining that the first activated PNIC has failed:
    deactivating, by the host link aggregator, the first activated PNIC;
    sending, by the host link aggregator, a first message to a first virtual link aggregator hosted on a first virtual machine executing on the host computer system, wherein the first message indicates that the first activated PNIC has failed;
  receiving, by the first virtual link aggregator, the first message;
  determining, by the first virtual link aggregator, the first activated PNIC has failed based on the first message; and
  based on determining that the first activated PNIC has failed:
    removing, by the first virtual link aggregator, a first entry corresponding with the first activated PNIC from a first list, wherein the first virtual link aggregator is configured to maintain the first list identifying the plurality of activated PNICs.

11. The non-transitory computer readable storage medium of claim 10, the method further comprising:
  selecting, by the first virtual link aggregator using the first list, a second activated PNIC from the plurality of activated PNICs for servicing a first network connection; and
  determining, by the first virtual link aggregator based on the second activated PNIC and a first virtual function mapping, a first virtual function configured for the second activated PNIC, wherein the first virtual function mapping associates the first virtual machine with the first virtual function,
  wherein a virtual network interface card (VNIC) for the first virtual machine uses the first virtual function to directly transfer network traffic for the first network connection between the first virtual machine and the second activated PNIC, and
  wherein the second activated PNIC sends the first data packet over the network.

12. The non-transitory computer readable storage medium of claim 11, the method further comprising:
  determining, by the host link aggregator, the first virtual function configured for the second activated PNIC;
  creating, by the host link aggregator, the first virtual function mapping associating the first virtual machine with the first virtual function configured for the second activated PNIC; and
  adding, by the first virtual link aggregator, a second entry to the first list, wherein the second entry corresponds with the second activated PNIC.

13. The non-transitory computer readable storage medium of claim 11, wherein directly transferring network traffic for the first network connection between the first virtual machine and the second activated PNIC does not require (i) processing network traffic for the first network connection by a hypervisor executing on the host computer system and (ii) processing network traffic for the first network connection by a host operating system.

14. The non-transitory computer readable storage medium of claim 10, the method further comprising:
  based on determining that the first activated PNIC has failed:
    sending, by the host link aggregator, a second message to a second virtual link aggregator hosted on a second virtual machine executing on the host computer system, wherein the second message indicates that the first activated PNIC has failed;
  receiving, by the second virtual link aggregator, the second message;
  determining, by the second virtual link aggregator, the first activated PNIC has failed based on the second message; and
  based on determining that the first activated PNIC has failed:
    removing, by the second virtual link aggregator, a second entry corresponding with the first activated PNIC from a second list, wherein the second virtual link aggregator is configured to maintain the second list identifying the plurality of activated PNICs.

15. The non-transitory computer readable storage medium of claim 14, the method further comprising:
   selecting, by the second virtual link aggregator using the second list, a second activated PNIC from the plurality of activated PNICs for servicing a first network connection; and
   determining, by the second virtual link aggregator based on the second activated PNIC and a first virtual function mapping, a first virtual function configured for the second activated PNIC, wherein the first virtual function mapping associates the second virtual machine with the first virtual function,
   wherein a VNIC for the second virtual machine uses the first virtual function to directly transfer network traffic for the first network connection between the second virtual machine and the second activated PNIC, and
   wherein the second activated PNIC sends network traffic for the first network connection over the network.

16. The non-transitory computer readable storage medium of claim 15, the method further comprising:
   determining, by the host link aggregator, the first virtual function configured for the second activated PNIC;
   creating, by the host link aggregator, the first virtual function mapping associating the second virtual machine with the first virtual function configured for the second activated PNIC; and
   adding, by the second virtual link aggregator, a third entry to the second list, wherein the third entry corresponds with the second activated PNIC.

17. The non-transitory computer readable storage medium of claim 15, wherein directly transferring network traffic for the first network connection between the second virtual machine and the second activated PNIC does not require processing of network traffic for the first network connection by a hypervisor executing on the host computer system and processing of network traffic for the first network connection by a host operating system.

* * * * *

UNITED STATES PATENT AND TRADEMARK OFFICE
CERTIFICATE OF CORRECTION

PATENT NO. : 9,036,464 B2  
APPLICATION NO. : 13/650490  
DATED : May 19, 2015  
INVENTOR(S) : Droux et al.

Page 1 of 1

It is certified that error appears in the above-identified patent and that said Letters Patent is hereby corrected as shown below:

In the specification,

In column 2, line 66, delete "PCI-SIG" and insert -- PCI-SGI® --, therefor.

In column 3, line 54, delete "Morover," and insert -- Moreover, --, therefor.

In column 5, line 39, delete "NIC." and insert -- VNIC. --, therefor.

Signed and Sealed this  
Ninth Day of February, 2016

Michelle K. Lee  
*Director of the United States Patent and Trademark Office*